(12) United States Patent
Safai (10) Patent No.: US 10,714,299 B2
(45) Date of Patent: Jul. 14, 2020

(54) THERMOELECTRICALLY-COOLED X-RAY SHIELD (71) Applicant: The Boeing Company, Chicago, IL (US)

(72) Inventor: Morteza Safai, Newcastle, WA (US)

(73) Assignee: The Boeing Company, Chicago, IL (US)

(*) Notice: Subject to any disclaimer, the term of this patent is extended or adjusted under 35 U.S.C. 154(b) by 23 days.

(21) Appl. No.: 16/140,278

(22) Filed: Sep. 24, 2018

(65) Prior Publication Data
US 2020/0098536 A1 Mar. 26, 2020

(51) Int. Cl.
G01N 23/203 (2006.01)
H01J 35/10 (2006.01)
H05G 1/06 (2006.01)
H01J 35/16 (2006.01)

(52) U.S. Cl.
CPC .......... H01J 35/106 (2013.01); G01N 23/203 (2013.01); H01J 35/16 (2013.01); H05G 1/06 (2013.01)

(58) Field of Classification Search
CPC ...................................................... H05G 1/025
See application file for complete search history.

(56) References Cited

U.S. PATENT DOCUMENTS 9,151,721 B2 * 10/2015 Safai .................... G01N 23/203

* cited by examiner

Primary Examiner — Hoon K Song
(74) Attorney, Agent, or Firm — Kunzler Bean & Adamson (57) ABSTRACT Disclosed herein is a system for x-ray backscatter inspection. The system comprises an interior cavity. The system also comprises a non-conductive fluid contained within the interior cavity. The system additionally comprises a power source within the interior cavity and submerged in the non-conductive fluid. The system further comprises an x-ray cathode within the interior cavity, submerged in the non-conductive fluid, and coupled to the power source. The system also comprises an x-ray anode within the interior cavity, submerged in the non-conductive fluid, and positioned to receive an electron emission from the x-ray cathode to generate an x-ray emission. The system additionally comprises a thermoelectric cooler surrounding the interior cavity and operable to draw heat from the non-conductive fluid.

22 Claims, 4 Drawing Sheets

THERMOELECTRICALLY-COOLED X-RAY SHIELD

FIELD

This disclosure relates generally to x-ray inspection techniques, and more particularly to apparatuses, systems, and methods for thermoelectrically-cooling an x-ray shield during non-destructive inspection of a part.

BACKGROUND

Some inspection techniques, such as non-destructive testing, foreign object detection, non-line-of-site examination, etc., are employed when destruction of a part to be inspected is not desirable. Certain x-ray inspection techniques provide a penetrating scan or examination of a part. Such x-ray inspection techniques are used in a variety of applications, such as homeland security, oil and gas mining and refining, pipeline inspection, transportation, automotive, aerospace, marine, mining, shipping, and storage, among others.

Some x-ray inspection techniques utilize the detection of x-rays that pass through a part, from one side of the part to the opposite side of the part. In other inspection techniques, such as x-ray backscattering techniques, the x-rays reflected back from the part (e.g., backscattered x-rays) are detected and then used to produce images or an analysis of the part. The pattern and intensity of the x-rays depends upon the materials and organization of the part. Accordingly, the pattern and intensity of the detected x-rays can be used to generate an image, which is relied upon to determine a quality, characteristic, or anomaly of the part.

Traditionally, an x-ray generation incorporates a compressive or chiller-type cooling system to handle the heat created during the generation of x-rays. These systems are stand-alone systems which add complexity, size, weight, and cost to the system. Because of the additional complexity, size, weight, and cost of the cooling system, applications are limited and considerable effort is required to transport and position the equipment needed for an x-ray inspection procedure.

SUMMARY

The subject matter of the present application has been developed in response to the present state of the art, and in particular, in response to the shortcomings of traditional x-ray inspection devices, that have not yet been fully solved by currently available techniques. Accordingly, the subject matter of the present application has been developed to provide a thermoelectrically-cooled x-ray shield, and associated apparatuses, systems, and methods, that overcomes at least some of the above-discussed shortcomings of prior art techniques.

Disclosed herein is a system for x-ray backscatter inspection. The system comprises an interior cavity. The system also comprises a non-conductive fluid contained within the interior cavity. The system additionally comprises a power source within the interior cavity and submerged in the non-conductive fluid. The system further comprises an x-ray cathode within the interior cavity, submerged in the non-conductive fluid, and coupled to the power source. The system also comprises an x-ray anode within the interior cavity, submerged in the non-conductive fluid, and positioned to receive an electron emission from the x-ray cathode to generate an x-ray emission. The system additionally comprises a thermoelectric cooler surrounding the interior cavity and operable to draw heat from the non-conductive fluid. The preceding subject matter of this paragraph characterizes example 1 of the present disclosure.

The thermoelectric cooler comprises an x-ray shielding material. The preceding subject matter of this paragraph characterizes example 2 of the present disclosure, wherein example 2 also includes the subject matter according to example 1, above.

The x-ray shielding material comprises lead. The preceding subject matter of this paragraph characterizes example 3 of the present disclosure, wherein example 3 also includes the subject matter according to example 2, above.

The x-ray shielding material comprises lead telluride. The preceding subject matter of this paragraph characterizes example 4 of the present disclosure, wherein example 4 also includes the subject matter according to example 3, above.

The system further comprises a plurality of thermoelectric coolers in a stacked arrangement. The preceding subject matter of this paragraph characterizes example 5 of the present disclosure, wherein example 5 also includes the subject matter according to any one of examples 1-4, above.

Each of the plurality of thermoelectric coolers comprises a heat absorption layer and a heat dissipation layer. A first thermoelectric cooler, of the plurality of thermoelectric coolers, is positioned with the heat dissipation layer of the first thermoelectric cooler abutting a heat absorption layer of a second thermoelectric cooler, of the plurality of thermoelectric coolers. The preceding subject matter of this paragraph characterizes example 6 of the present disclosure, wherein example 6 also includes the subject matter according to example 5, above.

A heat absorption layer of the thermoelectric cooler defines the interior cavity. The preceding subject matter of this paragraph characterizes example 7 of the present disclosure, wherein example 7 also includes the subject matter according to any one of examples 1-6, above.

An enclosure is positioned between the interior cavity and the thermoelectric cooler and defines the interior cavity. The preceding subject matter of this paragraph characterizes example 8 of the present disclosure, wherein example 8 also includes the subject matter according to any one of examples 1-7, above.

The system further comprises at least one heat exchanger located, at least one of, within the interior cavity or at an exterior of the thermoelectric cooler. The preceding subject matter of this paragraph characterizes example 9 of the present disclosure, wherein example 9 also includes the subject matter according to any one of examples 1-8, above.

The x-ray anode comprises a rotating anode. The preceding subject matter of this paragraph characterizes example 10 of the present disclosure, wherein example 10 also includes the subject matter according to any one of examples 1-9, above.

Rotation of the x-ray anode mixes the non-conductive fluid. The preceding subject matter of this paragraph characterizes example 11 of the present disclosure, wherein example 11 also includes the subject matter according to example 10, above.

The thermoelectric cooler comprises a heat dissipation layer forming an exterior surface of the system and a heat absorption layer disposed opposite the heat dissipation layer. The preceding subject matter of this paragraph characterizes example 12 of the present disclosure, wherein example 12 also includes the subject matter according to any one of examples 1-11, above.

At least one of the heat dissipation layer and the heat absorption layer are electrically insulating. The preceding subject matter of this paragraph characterizes example 13 of the present disclosure, wherein example 13 also includes the subject matter according to example 12, above.

Further disclosed herein is a method of generating an x-ray. The method comprises directing electrical power from a power source, within an interior cavity, to an x-ray cathode within the interior cavity. The method also comprises directing an electron emission from the x-ray cathode to an x-ray anode within the interior cavity. The method additionally comprises generating an x-ray emission at the x-ray anode in response to receiving the electron emission at the x-ray anode. The method further comprises absorbing thermal energy with a non-conductive fluid within the interior cavity. The method also comprises extracting the thermal energy from the non-conductive fluid with a thermoelectric cooler. The method further comprises dissipating the thermal energy at a heat dissipation layer of the thermoelectric cooler. The method additionally comprises blocking the x-ray emission directed towards the thermoelectric cooler. The preceding subject matter of this paragraph characterizes example 14 of the present disclosure.

Dissipating the thermal energy at the heat dissipation layer of the thermoelectric cooler further comprises absorbing, by a heat absorption layer of a second thermoelectric cooler, the thermal energy from a heat dissipation layer of a first thermoelectric cooler and dissipating the thermal energy at a heat dissipation layer of the second thermoelectric cooler. The preceding subject matter of this paragraph characterizes example 15 of the present disclosure, wherein example 15 also includes the subject matter according to example 14, above.

The method further comprises rotating the x-ray anode to mix the non-conductive fluid. The preceding subject matter of this paragraph characterizes example 16 of the present disclosure, wherein example 16 also includes the subject matter according to any one of examples 14 or 15, above.

The method further comprises passing a portion of the x-ray emission through an emission port. The preceding subject matter of this paragraph characterizes example 17 of the present disclosure, wherein example 17 also includes the subject matter according to any one of examples 14-16, above.

The method further comprises applying an electric current to the thermoelectric cooler to activate the thermoelectric cooler. The preceding subject matter of this paragraph characterizes example 18 of the present disclosure, wherein example 18 also includes the subject matter according to any one of examples 14-17, above.

Applying the electric current to the thermoelectric cooler comprises applying the electric current to a lead-based component of the thermoelectric cooler. The preceding subject matter of this paragraph characterizes example 19 of the present disclosure, wherein example 19 also includes the subject matter according to example 18, above.

Blocking the x-ray emission further comprises blocking the x-ray emission with the lead-based component. The preceding subject matter of this paragraph characterizes example 20 of the present disclosure, wherein example 20 also includes the subject matter according to example 19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
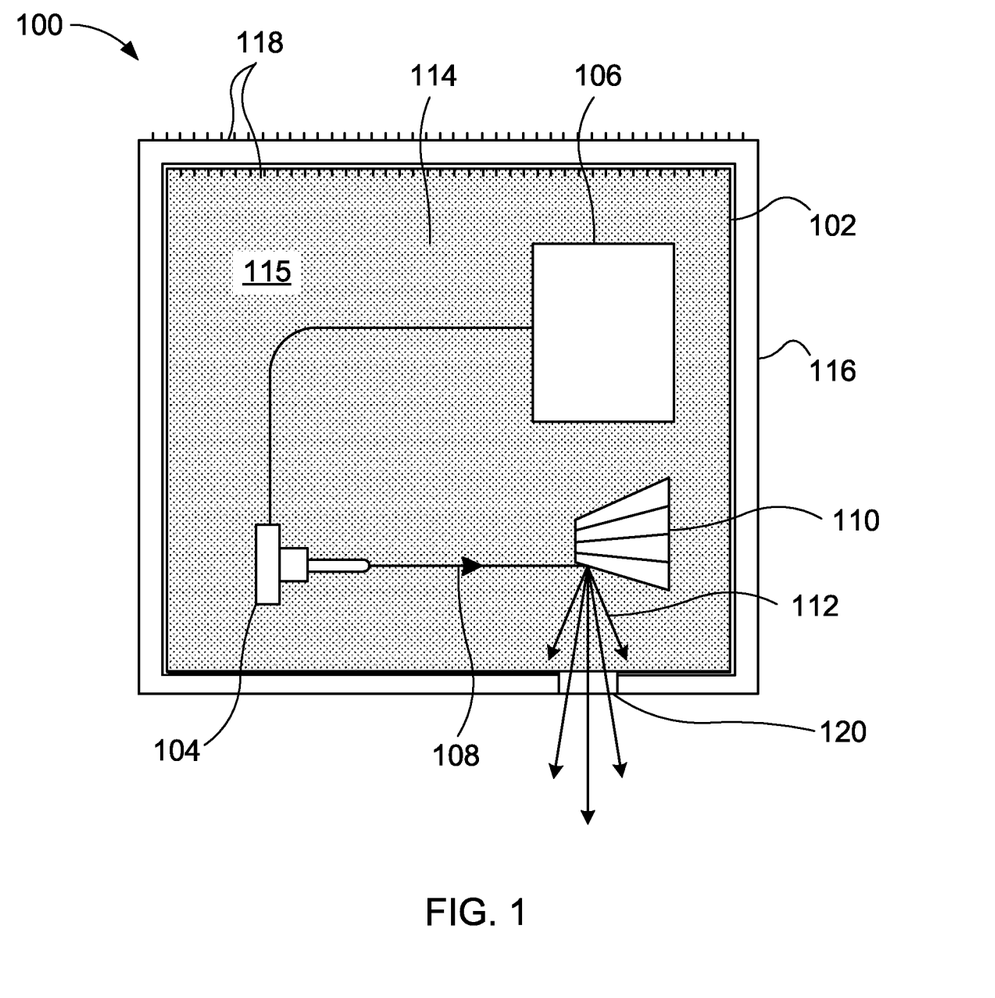
FIG. 1 is a schematic view of an x-ray emitter, according to one or more embodiments of the present disclosure.

Referring to FIG. 1, a system 100 for generating x-rays is shown. The system 100 includes an enclosure 102. The system 100 also includes a cathode 104 and an anode 110. The cathode 104 and the anode 110 are connected to a power source 106. The cathode 104 is selectively operable to generate an electron emission 108 that is received at the anode 110. The anode 110 receives the electron emission 108, from the cathode 104, and generates an x-ray emission 112. The x-ray emission 112 is directed towards an emission aperture 120 formed in the enclosure 102. The emission aperture 120 allows a portion of the x-ray emission 112, from the anode 110, to pass out of the system 100, while a separate portion of the x-ray emission 112 is at least partially blocked from exiting the system 100. For example, one or more of the enclosure 102, a heat exchanger 118, or a thermoelectric cooler 116 may block at least a portion of the x-ray emission 112. The portion of the x-ray emission 112 that passes through the emission aperture 120 may be used for x-ray inspection or for other purposes. The emission aperture 120 may include materials which are x-ray transparent. For example, if the heat exchanger 118 provides primary shielding for the system 100, the heat exchanger 118 may be omitted at the emission aperture 120. The emission aperture 120 may include materials separate from the heat exchanger 118, the thermoelectric cooler 116, and the enclosure 102 or may include continuations of these components.

In the illustrated representation, the anode 110 of the system 100 is a rotating anode. However, in other representations, the anode 110 of the system 100 does not rotate. The anode 110 can be a tungsten anode coupled to a rotor, or other feature, to facilitate relative rotation between the anode 110 and cathode 104.

The interior cavity 115 contains an electrically non-conductive fluid 114. The non-conductive fluid 114 forms a fluid thermal connection between the components disposed within the interior cavity 115 and the thermoelectric cooler 116 surrounding the interior cavity 115. In other words, the non-conductive fluid 114 facilitates the transmission of thermal energy (i.e., heat) from at least one of the cathode 104, the power source 106, and the anode 110 to the thermoelectric cooler 116. In some embodiments, rotation of the anode 110 creates a mixing effect or current within the enclosure 102. A pump, stirring device, or other mixing mechanism may be incorporated in place of, or in addition to, the rotation of the anode 110 to move the non-conductive fluid 114 within the enclosure 102. Movement of the non-conductive fluid 114 may increase the effectiveness of moving heat away from the components within the enclosure 102.

The thermoelectric cooler 116 is operable to draw thermal energy from the non-conductive fluid 114 within the interior cavity 115 and to dissipate the thermal energy received from the non-conductive fluid 114 out of the system 100. In the embodiment of FIG. 1, thermal energy from the non-conductive fluid 114 is received indirectly from the enclosure 102 as the thermal energy is transmitted from the non-conductive fluid 114 through the enclosure 102. The thermal energy may be dissipated by the thermoelectric cooler 116 via at least one of radiation, convection, and conduction. The system 100 further includes one or more heat exchangers 118 thermally coupled to the thermoelectric cooler 116. In one example, a heat exchanger 118 is thermally coupled to an exterior surface of the cooler 116. Alternatively, or additionally, a heat exchanger 118 is thermally coupled to an interior surface of the enclosure 102. The heat exchanger 118 may be a particular material (e.g., copper, lead, etc.) and/or have a particular surface feature (e.g., fins) conducive to heat exchange. The heat exchanger 118 may improve heat transfer at the interior of the enclosure 102, at an exterior of the thermoelectric cooler 116, or both. With the heat exchanger 118 on the exterior of the thermoelectric cooler 116, ambient air may remove heat from the system 100. In some embodiments, a fan, pump, or other forced air arrangement, may be used to further increase heat dissipation at the thermoelectric cooler 116. With the heat exchanger 118 positioned within the enclosure 102, the heat exchanger 118 functions as a sink to facilitate absorption of heat from the non-conductive fluid 114. With the heat exchanger 118 positioned outside the enclosure 102, the heat exchanger 118 functions as a heat source to facilitate dissipation of the heat from the system 100.

Figure 2:
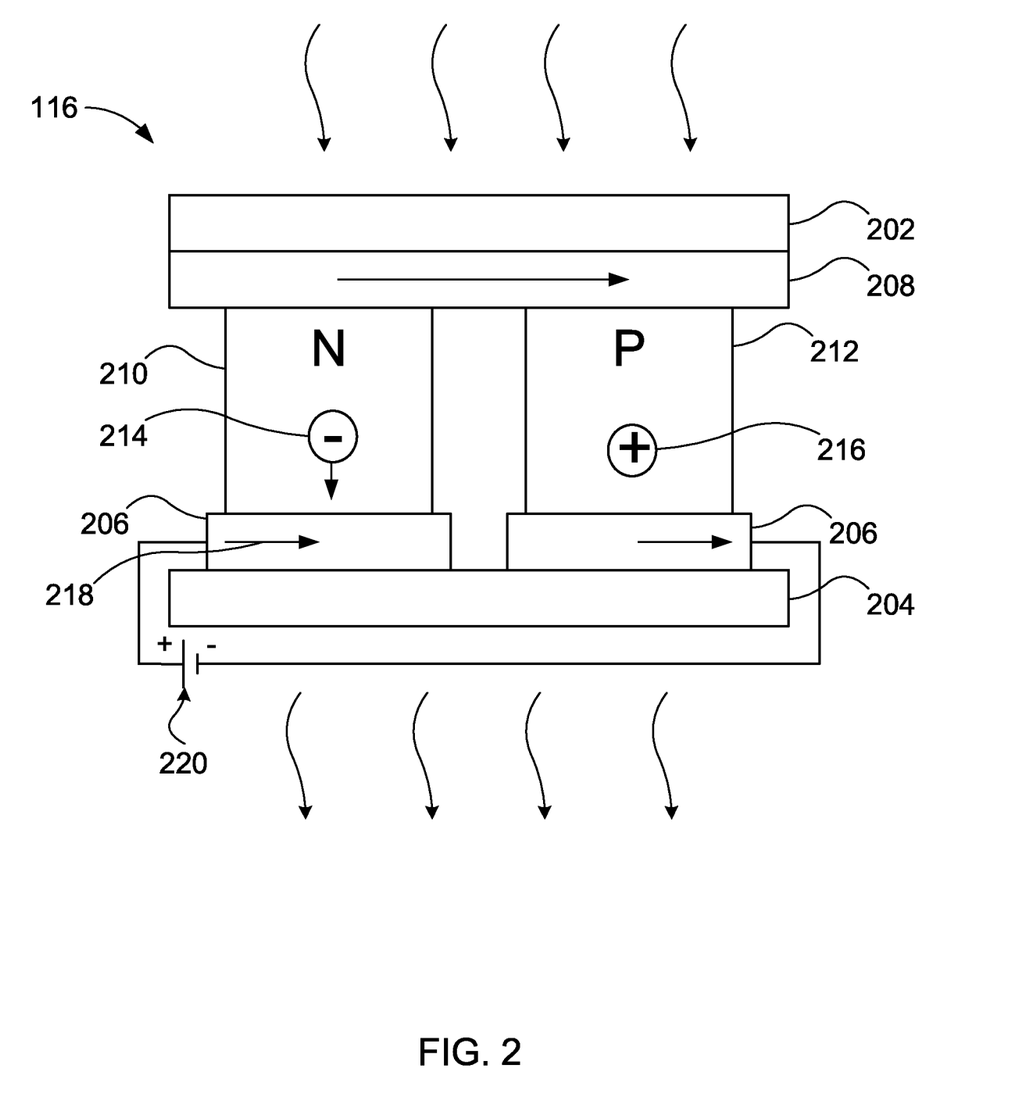
FIG. 2 is a schematic view of a thermoelectric cooler, according to one or more embodiment of the present disclosure.

Referring to FIG. 2, the thermoelectric cooler 116 of FIG. 1 includes a heat absorption layer 202 and a heat dissipation layer 204. The heat dissipation layer 204 and the heat absorption layer 202 are electrically non-conductive (i.e., made of an electrically non-conductive material). An n-type semiconductor 210 and a p-type semiconductor 212 are shown in a thermally parallel arrangement positioned between the heat dissipation layer 204 and the heat absorption layer 202. In other words, the n-type semiconductor 210 and the p-type semiconductor 212 simultaneously carry thermal energy from the heat absorption layer 202 to the heat dissipation layer 204.

The thermoelectric cooler 116 further includes first conductors 206 each disposed between the heat dissipation layer 204 and first ends of the n-type semiconductor 210 or between the heat dissipation layer 204 and first ends of the p-type semiconductor 212, respectively. The first conductors 206 provide separate electrical connections with the n-type semiconductor 210 and the p-type semiconductor 212. A second conductor 208 is disposed between the heat absorption layer 202 and second ends of the n-type semiconductor 210 and second end of the p-type semiconductor 212. The second conductor 208 forms an electrical connection between the second ends of the n-type semiconductor 210 and the p-type semiconductor 212.

In the illustrated embodiment, the first conductors 206 are coupled to a power source 220. The power source 220 may be the power source 106 shown in FIG. 1 or the power source 220 may be independent of the power source 106. The power source 220 delivers current 218 to the first conductor 206, associated with the n-type semiconductor 210, and the applied current 218 flows across the n-type semiconductor 210. The n-type semiconductor 210 has a first electron density 214 which is different from a second electron density 216 of the p-type semiconductor 212. The current moves through the second conductor 208 and across the p-type semiconductor 212 to the first conductor 206. The current flow in the n-type semiconductor 210 and the p-type semiconductor 212 creates a thermal profile by moving thermal energy from the heat absorption layer 202 to the heat dissipation layer 204, which induces a transfer of heat into and dissipated from the thermoelectric cooler 116 as shown. In this manner, the thermoelectric cooler 116 may provide cooling for the system 100 of FIG. 1.

In some embodiments, lead or a lead-based material is incorporated into one or more of the components of the thermoelectric cooler 116. For example, lead or a lead-based material may be used in one or more of the first conductor 206, the second conductor 208, the n-type semiconductor 210, and the p-type semiconductor 212 to provide x-ray shielding. Additionally, or alternatively, lead or a lead-based material are incorporated into the one or more heat exchangers 118. Some embodiments may use a lead-telluride (PbTe) in at least one of the n-type semiconductor 210 and the p-type semiconductor 212 to provide x-ray shielding. Other semiconductor materials may also be used.

The heat absorption layer 202 may include a ceramic or other material which is electrically non-conductive. The heat exchanger 118 may be integrally formed in or on the heat absorption layer 202 or may be separate from and thermally coupled to the heat absorption layer 202. Similarly, the heat dissipation layer 204 may be made of an electrically non-conductive material. The heat dissipation layer 204 may be ceramic, composite, or the like. The heat exchanger 118 may be integrally formed in or separately thermally coupled to the heat dissipation layer 204 to increase surface area or otherwise aid in heat transfer. In some embodiments, the heat absorption layer 202 of the thermoelectric cooler 116 is effectually replaced by the non-conductive fluid 114.

In some arrangements, the heat absorption layer 202 may form or define the interior cavity 115. In other words, the enclosure 102 may be omitted and the heat absorption layer 202 of the thermoelectric cooler 116 may receive thermal energy directly from the non-conductive fluid 114. In this arrangement, the heat exchanger 118 may be applied directly to the heat absorption layer 202.

The materials selected for the components of the thermoelectric cooler 116 may exhibit similar or compatible thermal properties. The thermal properties of the components of the thermoelectric cooler 116 may include thermal conductivity, thermal expansion rates, thermal expansion amounts, and the like. For example, the heat exchanger 118 may be selected to couple with the thermal properties of the heat dissipation layer 204 or the first conductors 206.

As presented above, the thermoelectric cooler 116 includes materials which act as x-ray shielding. As shown in FIG. 1, the thermoelectric cooler 116 surrounds the enclosure 102 and forms the emission aperture 120. The thermoelectric cooler 116 may include one or more materials, such as lead or lead-based materials, which provide shielding to block x-rays that impinge at the thermoelectric cooler 116.

With the thermoelectric cooler 116 providing the shielding necessary for operation of the system 100, a separate shielding layer is obviated. Additionally, by implementing the thermoelectric cooler 116, the need for separate compressive or chiller-type cooling is reduced or obviated. This reduces the overall size, cost, complexity, and weight of the system 100 and provides a shielded self-cooling or all-in-one arrangement.

Figure 3:
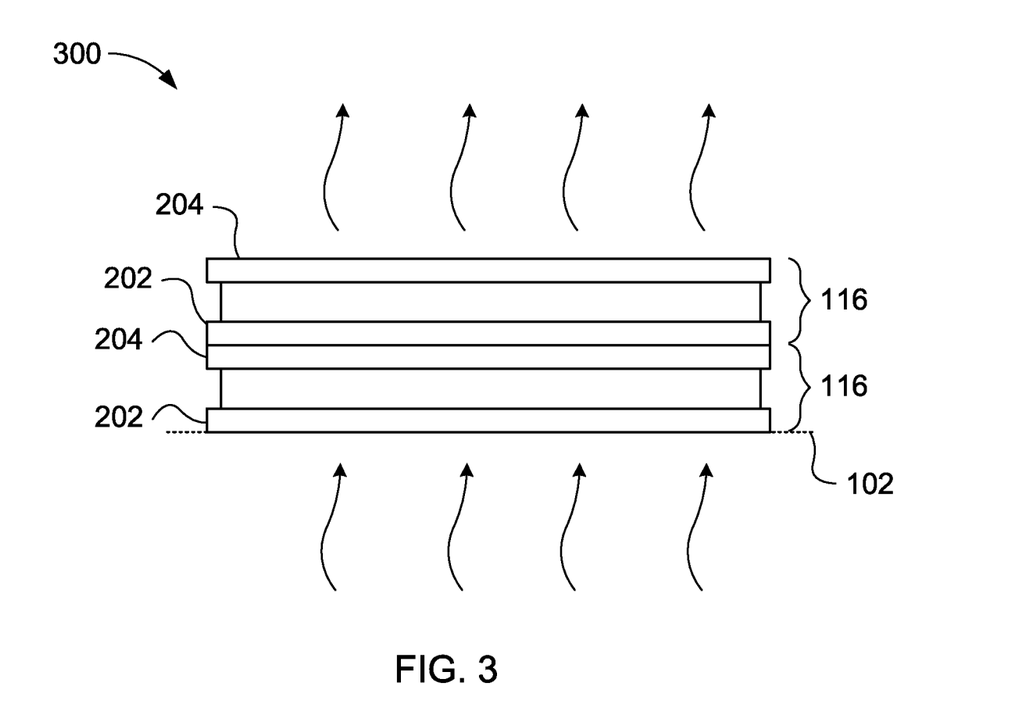
FIG. 3 is a perspective view of a plurality of thermoelectric coolers, according to one or more embodiments of the present disclosure.

Referring to FIG. 3, the thermoelectric cooler 116 may be replaced with a thermoelectric cooler stack 300 comprising a plurality of thermoelectric coolers 116 in a stacked configuration to further enhance the cooling capabilities. For example, if the thermoelectric cooler 116 is capable of creating a temperature difference of fifty degrees between the heat absorption layer 202 and the heat dissipation layer 204, the thermoelectric cooler stack 300 having two layers of thermoelectric coolers can achieve a temperature difference of one-hundred degrees across the thermoelectric cooler stack 300. Additionally, while two layers are shown, the thermoelectric cooler stack 300 may include more than two layers of thermoelectric coolers 116. In some instances, additional layers of thermoelectric coolers 116 may be incorporated to handle a cooling load. For example, the cooling load may be related to a position on the system 100 based on proximity to a thermally active component within the system 100, a current in the non-conductive fluid 114, available space surrounding the system 100, or the like.

In the illustrated embodiment, a first one of the thermoelectric coolers 116 of the thermoelectric cooler stack 300 is disposed to couple the heat absorption layer 202 of the first one of the thermoelectric coolers 116 to the enclosure 102. The heat dissipation layer 204 of the first one of the thermoelectric coolers 116 of the thermoelectric cooler stack 300 abuts a heat absorption layer 202 of a second one of the thermoelectric coolers 116 of the thermoelectric cooler stack 300 with the heat dissipation layer 204 of the second one of the thermoelectric coolers 116 positioned to dissipate thermal energy to its surroundings. In some arrangements, the abutted heat dissipation layer 204 and heat absorption layer 202 are a single layer joining the corresponding thermoelectric coolers 116 of the thermoelectric cooler stack 300.

While the thermoelectric cooler stack 300 shows the thermoelectric coolers 116 aligned, the thermoelectric coolers 116 of the thermoelectric cooler stack 300 may be offset from one another. For example, one of the thermoelectric coolers 116 may be positioned to overlap a portion of another of the thermoelectric coolers 116 and overlap a portion of yet another thermoelectric cooler 116 (not shown). Staggering the thermoelectric coolers 116 may provide improved shielding, reduce separation of thermoelectric coolers 116 due to thermal expansion, or allow for the use of thermoelectric coolers 116 of different sizes, thicknesses, or shapes based on position within the system 100 or other variables. For example, some thermoelectric coolers 116 may be formed with or have a bend to accommodate and provide cover for one or more corners or edges of the system 100 while other layers of thermoelectric cooler stack 300 may be joined at a corner or edge.

Figure 4:
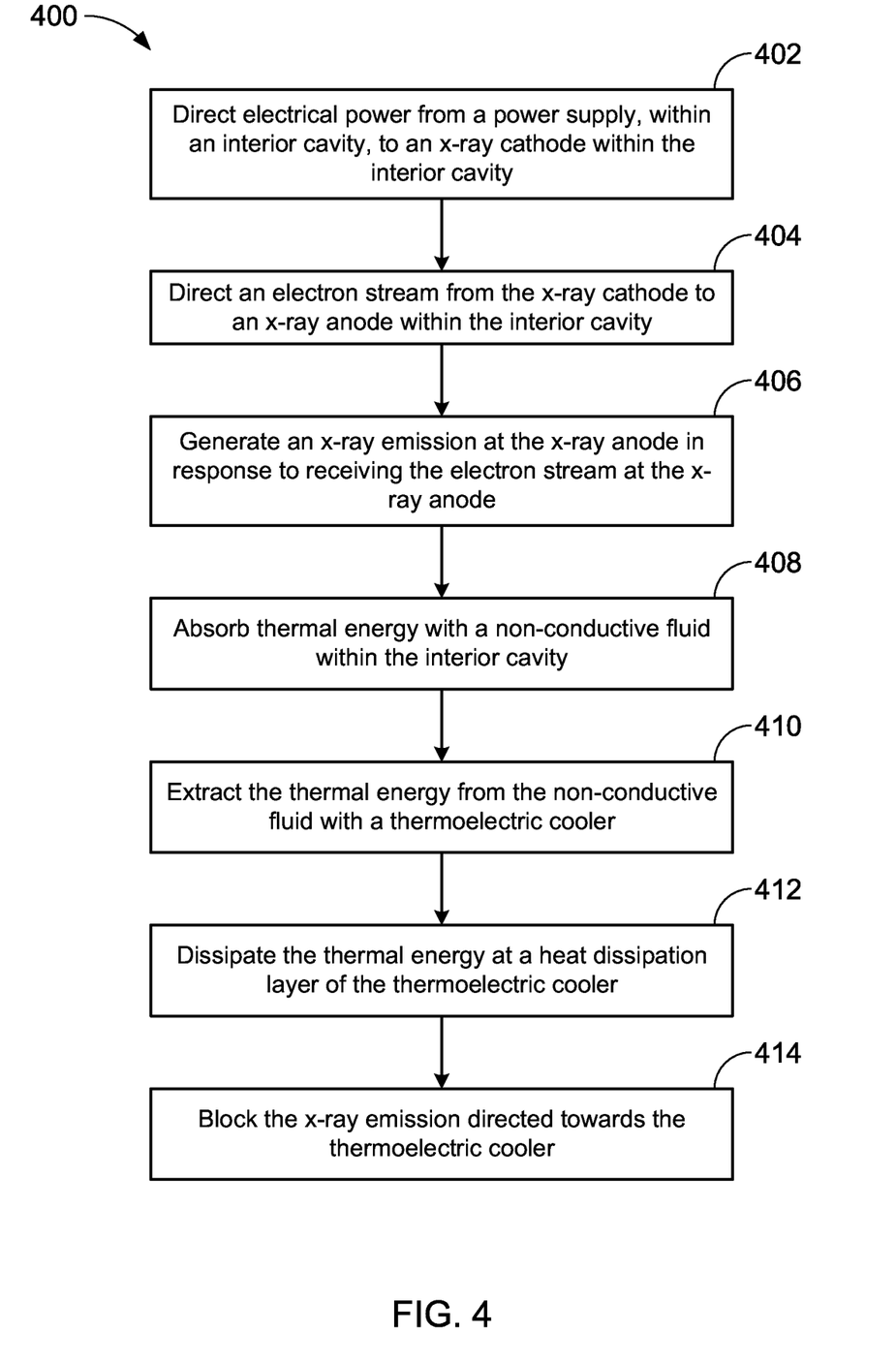
FIG. 4 is a flow diagram of a method of forming an x-ray bean for x-ray inspection, according to one or more embodiments of the present disclosure.

Referring to FIG. 4, a method 400 of x-ray generation is shown. The method 400 includes directing electrical power from a power supply, within an interior cavity, to an x-ray cathode within the interior cavity, at 402. Additionally, the method 400 includes directing an electron stream from the x-ray cathode to an x-ray anode within the interior cavity, at 404. The method 400 also includes generating an x-ray emission at the x-ray anode in response to receiving the electron stream at the x-ray anode, at 406. The method 400 further includes absorbing thermal energy with a non-conductive fluid within the interior cavity, at 408. Furthermore, the method 400 includes extracting the thermal energy from the non-conductive fluid with a thermoelectric cooler, at 410. The method 400 also includes dissipating the thermal energy at a heat dissipation layer of the thermoelectric cooler, at 412. The method 400 also includes blocking the x-ray emission directed towards the thermoelectric cooler, at 414.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A system for x-ray backscatter inspection, the system comprising:
    an interior cavity;
    a non-conductive fluid contained within the interior cavity;
    a power source within the interior cavity and submerged in the non-conductive fluid;
    an x-ray cathode within the interior cavity, submerged in the non-conductive fluid, and coupled to the power source;
    an x-ray anode within the interior cavity, submerged in the non-conductive fluid, and positioned to receive an electron emission from the x-ray cathode to generate an x-ray emission; and
    a thermoelectric cooler surrounding the interior cavity and operable to draw heat from the non-conductive fluid, wherein the thermoelectric cooler comprises a heat dissipation layer forming an exterior surface of the system and a heat absorption layer disposed opposite the heat dissipation layer.

2. The system according to claim 1, wherein the thermoelectric cooler comprises an x-ray shielding material.

3. The system according to claim 2, wherein the x-ray shielding material comprises lead.

4. The system according to claim 3, wherein the x-ray shielding material comprises lead telluride.

5. The system according to claim 1, further comprising a plurality of thermoelectric coolers in a stacked arrangement.

6. The system according to claim 5, wherein each of the plurality of thermoelectric coolers comprises a heat absorption layer and a heat dissipation layer, wherein a first thermoelectric cooler is positioned with the heat dissipation layer of the first thermoelectric cooler abutting a heat absorption layer of a second thermoelectric cooler.

7. The system according to claim 1, wherein a heat absorption layer of the thermoelectric cooler defines the interior cavity.

8. The system according to claim 1, wherein an enclosure is positioned between the interior cavity and the thermoelectric cooler and defines the interior cavity.

9. The system according to claim 1, further comprising at least one heat exchanger located, at least one of, within the interior cavity or at an exterior of the thermoelectric cooler.

10. The system according to claim 1, wherein the x-ray anode comprises a rotating anode.

11. The system according to claim 10, wherein rotation of the x-ray anode mixes the non-conductive fluid.

12. The system according to claim 1, wherein at least one of the heat dissipation layer and the heat absorption layer are electrically insulating.

13. A method of generating an x-ray, the method comprising:
    directing electrical power from a power source, within an interior cavity, to an x-ray cathode within the interior cavity;
    directing an electron emission from the x-ray cathode to an x-ray anode within the interior cavity;
    generating an x-ray emission at the x-ray anode in response to receiving the electron emission at the x-ray anode;
    absorbing thermal energy with a non-conductive fluid within the interior cavity;
    extracting the thermal energy from the non-conductive fluid with a first thermoelectric cooler;
    dissipating the thermal energy at a heat dissipation layer of the first thermoelectric cooler; and
    blocking the x-ray emission directed towards the thermoelectric cooler;
    wherein dissipating the thermal energy at the heat dissipation layer of the thermoelectric cooler further comprises:
        absorbing, by a heat absorption layer of a second thermoelectric cooler, the thermal energy from the heat dissipation layer of the first thermoelectric cooler; and
        dissipating the thermal energy at a heat dissipation layer of the second thermoelectric cooler.

14. The method according to claim 13, further comprising rotating the x-ray anode to mix the non-conductive fluid.

15. The method according to claim 13, further comprising passing a portion of the x-ray emission through an emission port.

16. The method according to claim 13, further comprising applying an electric current to the thermoelectric cooler to activate the thermoelectric cooler.

17. The method according to claim 16, wherein applying the electric current to the thermoelectric cooler comprises applying the electric current to a lead-based component of the thermoelectric cooler.

18. The method according to claim 17, wherein blocking the x-ray emission further comprises blocking the x-ray emission with the lead-based component.

19. The system for x-ray backscatter inspection according to claim 1, further comprising an emission aperture through which the x-ray emission is allowed to pass to exit the interior cavity, wherein the thermoelectric cooler directly defines the emission aperture.

20. A system for x-ray backscatter inspection, the system comprising:
    an interior cavity;
    a non-conductive fluid contained within the interior cavity;
    a power source within the interior cavity and submerged in the non-conductive fluid;
    an x-ray cathode within the interior cavity, submerged in the non-conductive fluid, and coupled to the power source;
    an x-ray anode within the interior cavity, submerged in the non-conductive fluid, and positioned to receive an electron emission from the x-ray cathode to generate an x-ray emission; and
    a plurality of thermoelectric coolers surrounding the interior cavity and operable to draw heat from the non-conductive fluid;
    wherein:
        the plurality of thermoelectric coolers is in a stacked arrangement; and
        each of the plurality of thermoelectric coolers comprises a heat absorption layer and a heat dissipation layer;
        a first thermoelectric cooler of the plurality of thermoelectric coolers is positioned with the heat dissipation layer of the first thermoelectric cooler abutting the heat absorption layer of a second thermoelectric cooler of the plurality of thermoelectric coolers.

21. A system for x-ray backscatter inspection, the system comprising:
    an interior cavity;
    a non-conductive fluid contained within the interior cavity;
    a power source within the interior cavity and submerged in the non-conductive fluid;
    an x-ray cathode within the interior cavity, submerged in the non-conductive fluid, and coupled to the power source;
    an x-ray anode within the interior cavity, submerged in the non-conductive fluid, and positioned to receive an electron emission from the x-ray cathode to generate an x-ray emission; and
    a thermoelectric cooler surrounding the interior cavity and operable to draw heat from the non-conductive fluid;
    wherein:
        the x-ray anode comprises a rotating anode; and
        rotation of the x-ray anode mixes the non-conductive fluid.

22. A method of generating an x-ray, the method comprising:
    directing electrical power from a power source, within an interior cavity, to an x-ray cathode within the interior cavity;
    directing an electron emission from the x-ray cathode to an x-ray anode within the interior cavity;
    generating an x-ray emission at the x-ray anode in response to receiving the electron emission at the x-ray anode;
    absorbing thermal energy with a non-conductive fluid within the interior cavity;
    extracting the thermal energy from the non-conductive fluid with a first thermoelectric cooler;
    dissipating the thermal energy at a heat dissipation layer of the first thermoelectric cooler;
    blocking the x-ray emission directed towards the thermoelectric cooler; and
    rotating the x-ray anode to mix the non-conductive fluid.

* * * * *